United States Patent [19]

Suominen et al.

[11] 4,137,134
[45] Jan. 30, 1979

[54] METHOD FOR THE RECOVERY OF SULPHUR COMPOUNDS, VOLATILE ALCOHOLS, TURPENTINE AND THE LIKE PRODUCED IN CONNECTION WITH PULPING

[75] Inventors: Jorma Suominen; Carl-Johan Candolin; Arvi Rönnholm, all of Pori, Finland

[73] Assignee: Oy W. Rosenlew Ab., Pori, Finland

[21] Appl. No.: 785,894

[22] Filed: Apr. 8, 1977

[30] Foreign Application Priority Data

Apr. 20, 1976 [FI] Finland .................................. 761069

[51] Int. Cl.² ............................................. B01D 3/10
[52] U.S. Cl. ..................................... 203/73; 203/92; 162/16
[58] Field of Search ....................... 203/92, 93, 88, 96, 203/73; 159/47 WL; 162/14, 16

[56] References Cited

U.S. PATENT DOCUMENTS

| | | | |
|---|---|---|---|
| 3,492,198 | 1/1970 | Rosenblad | 159/47 WL |
| 3,753,851 | 8/1973 | Gaillard | 159/47 WL |
| 3,763,020 | 10/1973 | Drew | 162/16 |
| 3,783,095 | 1/1974 | Jafs et al. | 159/47 WL |
| 3,807,479 | 4/1974 | Brannland | 159/47 WL |
| 4,002,525 | 1/1977 | Baierl | 159/47 WL |

*Primary Examiner*—Hiram H. Bernstein
*Attorney, Agent, or Firm*—Ladas, Parry, Von Gehr, Goldsmith & Deschamps

[57] ABSTRACT

A method for the recovery of sulphur compounds, volatile alcohols such as methanol, as well as by-products such as turpentine and the like, which are formed in connection with pulping, from the blow-expansion condensates from the evaporating series of a digestery, from turpentine mother liquors, or from other liquids in a separate treatment unit. The liquids are treated in a vacuum stripping unit by means of a proportion of secondary steam which is obtained from the last step of a multi-stage evaporating plant. The excess of secondary steam is condensed by means of indirect condensation in a first surface condenser, whose exhaust vapors, together with the vapors leaving the stripping unit and with gases that are to be removed from the evaporating steps, are condensed by means of indirect condensation in a second surface condenser. The condensate from the second surface condenser is used as return flow into the stripping unit, and the gases leaving the condenser are, by means of a vacuum device, passed into the condensate tank of the evaporating plant. The gas fraction obtained from the condensate tank is removed to a separate treatment, as well as the condensate fraction produced therein is either recirculated to the treatment or recovered separately. The purified liquid from the stripping unit is recirculated to the process.

16 Claims, 1 Drawing Figure

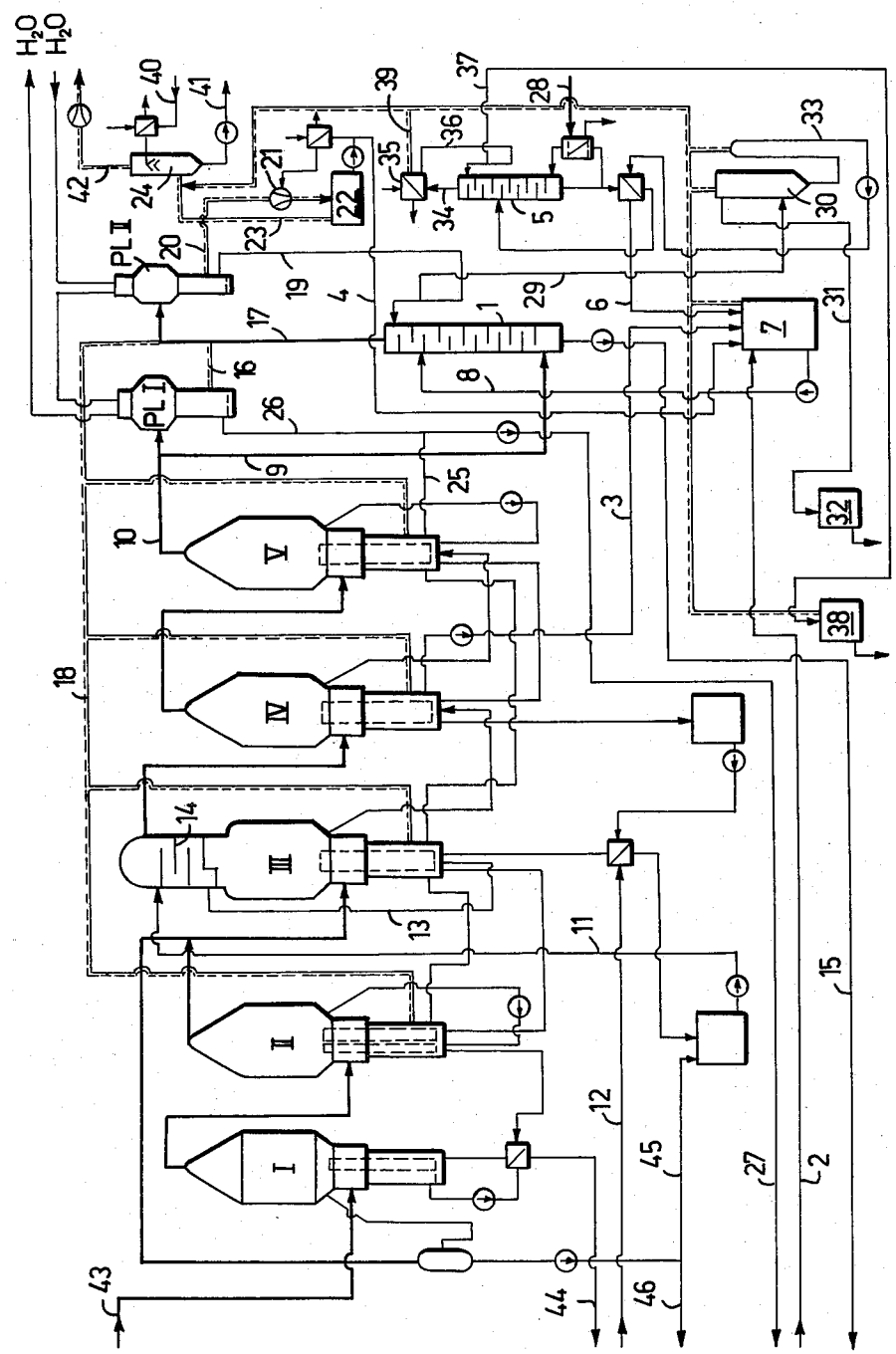

METHOD FOR THE RECOVERY OF SULPHUR COMPOUNDS, VOLATILE ALCOHOLS, TURPENTINE AND THE LIKE PRODUCED IN CONNECTION WITH PULPING

The present invention relates to a method which, without additional energy, permits efficient recovery of sulphur compounds and volatile alcohols and the like produced in connection with pulping and, thereby, reduction in the BOD value resulting from the substances discharged into the waterways and from the odor gases discharged into the air.

It is characteristic of the method in accordance with the invention that the recovery is performed from the blow-expansion condensates from evaporating series of a digester house, from turpentine mother liquors, or from other liquids in a separate stripping unit by means of a quantity of secondary steam required for the treatment of the liquid quantity, which secondary steam is obtained from the last stage of a multi-stage evaporating plant. The excess of the secondary steam is condensed by means of indirect condensation in the first surface condenser of the evaporating plant, whose exhaust vapors together with the vapors leaving the stripping unit and with the exhaust vapors that shall be removed from the evaporating steps are condensed by means of indirect condensing in the second surface condenser of the evaporating plant, whose condensate is used as return flow to the stripping unit, and the gases leaving the condenser are, by means of a vacuum device, passed into the condensate tank of the evaporating plant. The condensate fraction formed in the condensate tank is returned to the treatment or recovered separately, and the obtained gas fraction is removed to a separate treatment (which can be combustion or absorption). The liquid liberated from the components is removed from the stripping unit and recirculated into the cooking process at the same time as the gas fraction enriched by the components can be recovered for further concentration and separation of the components.

Attempts have been made to improve the recovery of sulphur compounds and volatile alcohols from the process condensates or waste liquors of the sulphate or sulphite process and thereby to avoid loading the air and water by waste from said processes while removing said liquids under atmospheric pressure with the aid of primary steam or intermediate steam from the industrial plant. Methods are also known by which components are recovered directly from the waste liquor which is under the cooking pressure.

These known methods, however, involve drawbacks which result in the fact that the maximum degree of recovery cannot be reached. When intermediate steam is used for stripping, a pressure loss takes place in the system, which must be compensated for by a larger heating surface, because the effective temperature gradient has become lower. The value of the stripping medium that has been used is, however, 4/5 in a 5-step evaporation or 5/6 in a 6-step evaporation if the vapor is removed from the series without being used for evaporation in the next step. When a vapor mixture from the stripping unit is used as steam in the next step, the aeration in this step must be higher than normally, which results in unnecessary secondary heat in connection with further condensing and cooling of the gases. By means of this method it is obviously possible to treat even large liquid quantities, even though the treatment units must be very extensive owing to the distillation factor (only approximately 7.2 mol/mol).

The expansion steam from the second expansion in a continuous cooking process is, for example, not sufficient for the treatment of the liquid quantities if one seeks an 80% degree of recovery of the components formed in the cooking process and included, e.g., in the cooking and evaporating condensates. In this connection the requirement of primary steam would become excessive. The stripping result in respect to the purity of the condensate can also be problematic owing to the high content of components in the feeding balance liquid/steam. The distillation factor at atmospheric pressure is, moreover, only approximately 7.2 mol/mol.

When the stripping is performed directly from the liquor with the aid of steam which has been liberated in connection with the expansion of the liquor after the temperature of the liquor has been lowered to a value lower than the temperature in the digester, the quantity of steam is not sufficient, e.g., for efficient stripping of methanol (unfavorable ratio of liquid to steam). When the stripping is performed at the cooking pressure by means of some other gas, the high-pressure steam from an intermediate tap must be used, whose value is considerably higher than the value of back-pressure steam, especially since the stripping of methanol by means of a liquid/steam ratio of 20 (50 kgs of vapour per ton of liquid) only gives an output of 35 percent.

The treated liquid quatities are, moreover, considerably higher (the liquor has a dry-substance content of 10 to 15%). The apparatuses must, moreover, stand high pressures, whereby the construction cost becomes double as compared with the unit with condensate stripping.

Moreover, in the case of high pressures, the distillation factor has a low value.

The object of the method in accordance with the present invention is to eliminate the above drawbacks, which object is achieved by stripping by means of secondary steam from the last stage in a multi-stage evaporating plant. The method in accordance with the present invention can be put into effect in many ways and does not only aim at recovering, e.g., methanol and sulphur compounds from process condensates, but it can also be used for recovering other products, such as volatile alcohols, turpentine, as well as sulphur compounds and the like from liquids in connection with pulping. Among the products that can be recovered can be mentioned additionally furfural and $SO_2$—water.

The method in accordance with the present invention involves the following advantages:

- a sufficient quantity of steam is available for obtaining a high stripping output,
- a sufficient quantity of steam is available for obtaining a high degree of recovery of the components formed in connection with the cooking (90% reduction in the BOD-value, resulting from methanol),
- the treatment is performed by means of the more advantageous secondary steam and with a higher distillation factor; the distillation factor has a value more than double as compared with same in connection with treatment at atmospheric pressure; the steam consumption is hereby only 50% as compared with the known procedure, and 16 to 25% of the steam from the last step, depending on whether the cooking process is discontinuous or continuous and whether the evaporating plant is a 5-step or 6-step plant and whether the desired output of stripping is 90 or 95%, the treatment does not necessarily have to have any effect on the construction of the conventional multi-stage evaporating plant, the treatment can be adapted to existing, complete evaporating plants, the treatment is not bound to the operation of the digestery, the treatment permits the use of a method either in liquid phase or in gas phase, by means of the treatment, the collecting of the non-condensable gases is centralized, the treatment has no effect on the heat economy of the evaporating plant.

It is additionally characteristic of the invention that the liquor intended for evaporation is passed to the step in the evaporating plant that is the most favorable step in view of the temperature of the liquor, in which step the components are liberated from the liquor to the secondary steam of the step, the condensate of which steam is removed in the condensate space for the next evaporation step and is admitted into the stripping unit for treatment. It is characteristic that the liquor is hereby subjected to stripping with the aid of secondary steam from the first feeding step and that the distillation bottoms are arranged in the vapor separator of the step or in its extension.

The invention and its additional features, as applied to a 5-step evaporating plant and to a liquid procedure, will be described more closely below with reference to the attached figure.

The figure illustrates an evaporating series working in 5 steps of indirect heat exchange, wherein the process condensates produced in connection with the sulphate cooking process are treated in accordance with the invention in the stripping unit 1.

The condensates that are to be treated consist of blowing condensates from the digester house and of turpentine mother liquors (discontinuous cooking) or of expansion condensates and mother liquors (continuous cooking) 2, the condensate 3 from the step IV, which follows after the, from the point of view of heat economy, most advantageous feeding unit in the evaporating series, the condensate 4 concentrated by means of vacuum circulation, from a condensate tank, as well as of the liquid 4 returned from the methanol concentrating unit 5.

The collected process condensates 8 from the tank 7 are passed into the treatment unit 1, wherein the condensates are treated with steam in a way in itself known for the purpose of removing sulphur compounds and volatile alcohols. The steam 9 for the treatment of the liquid in the treatment unit 1 consists of secondary steam from the last step V of the evaporating series. Since the feeding-in 11 of the liquor takes place into the, from the point of view of heat economy, most advantageous unit III, the large quantity of secondary steam that comes out from the last step V in the evaporating series is rather pure because of the three-fold evaporation of the liquor and, for example, contains only 10% of methanol accompanying the weak liquor 12 from the cooking plant, whereby the main part, i.e. about 50% in the application concerned, is included in the condensate 3 from the step IV. In order to concentrate the desired component into the condensate 3 efficiently, the liquor 11 is subjected to stripping in the unit III by means of secondary steam from this step, whereby the distillation bottoms are arranged in the gas separator of the step, or in its extension. Due to said operation, the proportion of the component enriched in the condensate 3 reaches 65%, and the proportion included in the steam is lowered to 5.5% as calculated on the quatity of the component in the liquor 12.

The proportion of steam 9 used in the stripping unit, of the secondary steam 10, contains only the proportion of the component that corresponds to the content in the steam 10. This results in the circumstance that the condensate 15, which is recirculated to the cooking process, has a high purity.

For the purpose of treating the condensates from the digestery and the condensates from the evaporation collected as described above in the stripping unit 1 with an output of 95%, in a discontinuous cooking process approximately 20% steam 9 and in a continuous cooking process approximately 25% steam 9 is required as calculated on the secondary steam 10 from the step V.

The excess of the secondary steam 10 is condensed by means of indirect condensation in the first surface condenser PL I of the evaporating series, the exhaust gases 16 of which are, together with the gas mixture 17 from the stripping unit 1 and with the gases 18 from the evaporating steps in the evaporating series, condensed by means of indirect condensation in the second surface condenser PL II. The condensate produced in the surface condenser is used as return flow 19 into the stripping unit 1 for the purpose of concentrating the component. The uncondensed gases 20 are, with the aid of the vacuum apparatus 21, passed to the condensate tank 22, whose gas fraction 23 is passed into a separate treatment unit 24 and whose condensate fraction is used after indirect cooling in the vacuum apparatus 21 for the purpose of dissolving alcohols and sulphur compounds from the gases passed into the vacuum apparatus, and the condensate 4 is passed back into the feeding tank 7.

The condensate 27, which consists of the condensate 25 and of the condensate 26 from PL I, in a discontinuous cooking process, contains only approximately 18.5% and, in a continuous cooking process, approximately 18% of the methanol coming in with the liquor. With a treatment output of 95%, an approximately 84% recovery of methanol is obtained in a discontinuous cooking process and an approximately 82% recovery in a continuous cooking process, and the purified liquid contains only 5% of the component introduced into treatment. This liquid 15 is suitable for recirculation, e.g., to washing or causticizing.

The figure also illustrates the concentrating unit 5 for methanol, wherein the return flow 19 from the surface condenser PL II is condensed with indirect steam by passing the solution 29 into an appropriate concentration, through the decanting apparatus 30 for turpentine, into the concentrating unit 5. The obtained turpentine 31 is passed to the tank 32, and the methanol-containing mother liquor is fed into the concentrating unit 5. The concentration in the concentrating unit is performed in a way in itself known with the aid of indirect steam. The gas mixture 34 from the concentrating unit 5 is condensed by means of indirect condensation in the condensating device 35. The condensate 36 produced in the condensating device is used as return flow to the unit 5 for the purpose of obtaining a desired methanol content, and the methanol is recovered in the form of a concentrated methanol solution 37, which is introduced into the tank 38.

The liquid 6 purified in the concentrating device 5 is returned to the feeding tank 7 and from there to the steam treatment in the stripping unit 1. The non-condensable gases 39 from the condensating device 35, for the concentrating unit 5, are combined with the aeration gases from the methanol tank 38, tank 7, and decanting apparatus 30 and with the leaving gases 23 from the condensate tank 22 and introduced into the gas washer 24, wherein the gases are washed with white liquor 40, whereby the white liquor dissolves the sulphur compounds (hydrogen sulphide, methylmercaptan) which are included in the gases and which are returned to the cooking process 41. The non-condensable gases 42 are passed to combustion.

The evaporating plant is operated by means of primary steam 43, whose condensate 44 is returned. The weak liquor 12 can be concentrated to feeding-in liquor, e.g., with the aid of concentrated liquor 45, which is at the same time passed to regeneration 46.

Below, some other embodiments of the invention will be described. The method in accordance with the invention is suitable for use as a gas-phase method, in which case the condensating device 5, the decanting apparatus 30 for turpentine, and the gas washer 24 are omitted. The gases liberated from the stripping unit remain then in the gas form and are removed from the surface condenser PL II as gases 20 and passed from there directly to combustion 23. The gas-phase procedure, however, involves the drawback that in that case all the valuable by-products from the process condensates are lost.

In accordance with the invention, in the stripping unit 1, it is also possible to treat other liquids besides process condensates, e.g., sulphite, sulphate, or NSSC waste liquors for the purpose of recovering liquid by-products contained in them, such as methanol, furfural, turpentine, and the like. $SO_2$-gas and $SO_2$-water can also be recovered in connection with the sulphite process, and $H_2S$-gas can be recovered from carbonized green liquor or black liquor in the sulphate process, whereby the obtaned $H_2S$-gas can be used for precooking.

It should be noted that the stripping unit is a vacuum stripping unit connected to the vacuum system of the evaporating unit. This makes it possible that a high output with a high distillation factor and with low energy consumption can be achieved.

The method in accordance with the invention permits that, from the point of view of connections, the evaporating series can be operated normally without the treatment unit or units and that the treatment unit can be operated without the evaporating series being in operation. In this connection, the steam proportion 10 from the step V can be replaced by primary steam and it is possible to make use of the surface condenser PL II as well as of the vacuum apparatus 21.

What I claim is:

1. A method for the recovery of materials selected from the group consisting of sulphur compounds, volatile alcohols such as methanol, and by-products such as turpentine, which are produced in connection with pulping, from blow-expansion condensates from evaporating series of digestery, from turpentine mother liquors, or from other liquids in a separate treatment unit, characterized in that said liquids are treated in a vacuum stripping unit by means of a proportion of secondary steam necessary for the treatment of the liquid quantity, which secondary steam is obtained from the last stage of a multi-stage evaporating plant, an excess of secondary steam is condensed by means of indirect condensation in a first surface condenser, whose exhaust vapors, together with the vapors leaving the stripping unit and with the exhaust vapors that are to be removed from the evaporating steps, are condensed by means of indirect condensation in a second surface condenser, the condensate from the latter is used as return flow into the stripping unit, and the gases leaving the condenser are, by means of a vacuum device, passed into the condensate tank of the evaporating plant, the gas fraction obtained from same is removed to a separate treatment, as well as the condensate fraction produced therein is either recirculated to the treatment or recovered separately, at the same time as purified liquid from the stripping unit is returned to the process and the return flow from the second surface condenser is recovered.

2. A method as claimed in claim 1, characterized in that the liquor intended for evaporation in the multi-stage evaporating plant is fed into the, from the point of view of its temperature, heat-economically most advantageous step of the multi-stage evaporating plant, wherein the components are liberated into the secondary steam of the step and the condensate is removed into the condensate space of the next evaporating step, the condensate flowing downstream at a sinking pressure in relation to the air stream and vapor stream and being taken for treatment.

3. A method as claimed in claim 2, characterized in that the liquor is stripped by means of secondary steam from the first feeding step of the liquor introduction of the liquor into the step.

4. A method as claimed in claim 3, characterized in that stripping bottoms are placed in the separator of the feeding-in step or in an extension of same.

5. A method as claimed in claim 3, characterized in that the condensate fraction that is obtained from the condensate tank of the evaporating plant is used as indirectly cooled in a vacuum device in order to dissolve volatile alcohols as well as sulphur compounds from the gases flowing into the vacuum device at the same time as the condensate is recirculated to the treatment or is recovered.

6. A method as claimed in claim 4, characterized in that the condensate fraction that is obtained from the condensate tank of the evaporating plant is used as indirectly cooled in a vacuum device in order to dissolve volatile alcohols as well as sulphur compounds from the gases flowing into the vacuum device at the same time as the condensate is recirculated to the treatment or is recovered.

7. A method as claimed in claim 1, characterized in that the stripping unit is a single-stage unit in which the obtained product is produced either in a gaseous form or in a liquid form.

8. A method as claimed in claim 7. characterized in that the condensate fraction that is obtained from the condensate tank of the evaporating plant is used as indirectly cooled in a vacuum device in order to dissolve volatile alcohols as well as sulphure compounds from the gases flowing into the vacuum device at the same time as the condensate is recirculated to the treatment or is recovered.

9. A method as claimed in claim 1, characterized in that the stripping unit is a multi-stage unit, in which the distillation in the first stage is performed by means of direct steam from the last stage of the evaporating plant and the condensate from the first stage is concentrated in the second stripping stage by means of indirect vapor into liquid products.

10. A method as claimed in claim 9, characterized in that the condensate fraction that is obtained from the condensate tank of the evaporating plant is used as indirectly cooled in a vacuum device in order to dissolve volatile alcohols as well as sulphur compounds from the gases flowing into the vacuum device at the same time as the condensate is recirculated to the treatment or is recovered.

11. A method as claimed in claim 9, characterized in that, from the condensate obtained from the first stripping step, turpentine is decanted before any other products are concentrated out of the condensate in the second stripping step.

12. A method as claimed in claim 11, characterized in that the condensate fraction that is obtained from the condensate tank of the evaporating plant is used as indirectly cooled in a vacuum device in order to dissolve volatile alcohols as well as sulphur compounds from the gases flowing into the vacuum device at the same time as the condensate is recirculated to the treatment or is recovered.

13. A method as claimed in claim 9, characterized in that the uncondensed gases that are to be removed from the condensate tank of the evaporating plant are washed in a gas washer by means of white liquor separately or together with the uncondensed gases that are removed from the condenser in the second stripping step.

14. A method as claimed in claim 1, characterized in that the liquor from the cooking step is introduced, as indirectly cooled, without expansion, into the, from the point of view of heat economy, most advantageous feeding-in stage in the multi-stage evaporating plant.

15. A method as claimed in claim 1, characterized in that the liquor from the cooking step is introduced, as indirectly cooled, without expansion, into the vacuum stripping unit.

16. A method as claimed in claim 11, characterized in that the decanted turpentine is decanted via white liquor.

* * * * *